(12) United States Patent
Conners et al.

(10) Patent No.: US 10,133,307 B2
(45) Date of Patent: Nov. 20, 2018

(54) DOCK FOR EXTENDING THE UTILITY OF AN ELECTRONIC DEVICE

(71) Applicant: CIGNA INTELLECTUAL PROPERTY, INC., Wilmington, DE (US)

(72) Inventors: Timothy Kent Conners, Devon, PA (US); Erik Krawiec, Collingswood, NJ (US); Jeremiah Blue Mountain Pierson, Bath, PA (US)

(73) Assignee: CIGNA INTELLECTUAL PROPERTY, INC., Wilmington, DE (US)

( * ) Notice: Subject to any disclaimer, the term of this patent is extended or adjusted under 35 U.S.C. 154(b) by 473 days.

(21) Appl. No.: 14/839,660

(22) Filed: Aug. 28, 2015

(65) Prior Publication Data

US 2017/0060185 A1    Mar. 2, 2017

(51) Int. Cl.
*G06F 13/00*    (2006.01)
*G06F 1/16*    (2006.01)
*G06F 13/40*    (2006.01)

(52) U.S. Cl.
CPC ........ *G06F 1/1632* (2013.01); *G06F 13/4081* (2013.01)

(58) Field of Classification Search
USPC .......................... 710/303, 105, 305, 313, 314
See application file for complete search history.

(56) References Cited

U.S. PATENT DOCUMENTS

| | | | |
|---|---|---|---|
| 7,027,768 B2 * | 4/2006 | Hill | 455/3.06 |
| 9,124,852 B2 * | 9/2015 | Bilbrey | |
| 2002/0186329 A1 * | 12/2002 | Tong et al. | 348/839 |
| 2006/0061958 A1 * | 3/2006 | Solomon et al. | 361/686 |
| 2006/0098666 A1 * | 5/2006 | Francis Conde Powell | 370/401 |
| 2006/0107295 A1 * | 5/2006 | Margis et al. | 725/81 |
| 2006/0230100 A1 * | 10/2006 | Shin et al. | 709/203 |
| 2007/0101039 A1 * | 5/2007 | Rutledge et al. | 710/303 |
| 2008/0301545 A1 * | 12/2008 | Zhang et al. | 715/235 |
| 2009/0063744 A1 * | 3/2009 | Krueger et al. | 710/303 |

(Continued)

OTHER PUBLICATIONS

Pro:Idiom System Description, <http://www.zenith.com/wp-content/uploads/2013/05/ProIdiom_Overview_2010-10-08.pdf>, accessed on Jun. 7, 2016.*

(Continued)

*Primary Examiner* — Tim T Vo
(74) *Attorney, Agent, or Firm* — Pillsbury Winthrop Shaw Pittman LLP

(57) ABSTRACT

Systems and methods for providing a dock that extends the utility of an electronic device are provided. In some embodiments, responsive to detecting an electronic device, a dock may cause an establishment of a connection between the dock and the electronic device. The dock may obtain one or more interface requirements for the electronic device that enable the dock to interact with the electronic device. The dock may obtain, via the established connection, based on the interface requirements, a request from an application of the electronic device for content stored at a source external to the dock and the electronic device. The dock may cause the requested content to be presented via at least one of the output devices responsive to obtaining the requested content from the external source.

19 Claims, 7 Drawing Sheets

(56) References Cited

U.S. PATENT DOCUMENTS

| | | |
|---|---|---|
| 2012/0054399 A1* | 3/2012 | Lemarchand ................ 710/303 |
| 2013/0080909 A1 | 3/2013 | Reeves et al. |
| 2013/0191575 A1* | 7/2013 | Hasenei ....................... 710/303 |
| 2014/0055495 A1* | 2/2014 | Kim et al. ................... 345/660 |
| 2014/0059623 A1* | 2/2014 | Hasenei ......................... 725/85 |
| 2014/0269523 A1* | 9/2014 | Wu et al. ..................... 370/329 |

OTHER PUBLICATIONS

Broida, Rick, "The ClamBook: A laptop powered by your smartphone", printed from http://www.cnet.com/news/the-clambook-a-laptop-powered-by-your-smartphone/#!, (2 pages).

"JUH660 Android AOA / OTG HUB Datasheet", printed from http://web.archive.org/web/20150221060641/http://www.5create.com/our-products/android/juh660.html, printed Jan. 19, 2016, 4 pages.

International Preliminary Report on Patentability PCT/US2016/049139 dated Mar. 6, 2018.

* cited by examiner

DOCK FOR EXTENDING THE UTILITY OF AN ELECTRONIC DEVICE

FIELD OF THE INVENTION

The invention relates to a dock for extending utility of an electronic device.

BACKGROUND OF THE INVENTION

In recent years, the popularity and growth of smartphones and other mobile devices have increased the demand for docking stations (or "docks"). Typical docks may, for example, enable specific portable devices (e.g., laptops, tablets, smartphones, etc.) to be connected to various peripherals (e.g., monitors, speakers, mouse, etc.) without the need for multiple cables. However, these docks are each generally limited to a specific type of device and are not compatible with many types of devices. Further, the functions of such docks are traditionally limited to connecting portable devices with additional peripherals. These and other drawbacks exist.

SUMMARY OF THE INVENTION

The disclosure relates to systems and methods for providing a dock that extends the utility of electronic devices. In some embodiments, an "intelligent" dock configured to pair with different electronic devices running different operating systems (e.g., iOS devices, Android devices, etc.) may be provided to extend the utility of the electronic devices. The dock may be configured to manage one or more interface requirements for different hardware and/or software components (e.g., for the respective electronic devices) so that the dock may be compatible with various types of electronic devices, enable more suitable presentation of content via one or more output devices, etc.

As an example, the dock may store the interface requirements (e.g., in its internal persistent storage) so that they may be obtained by the dock to (1) properly communicate with the electronic devices, (2) select, modify, or transmit content in a way so that the content is suitable for the electronic devices, (3) receive, modify, and present content from the electronic device in a way so that the content is more suitable for the dock, or (4) other operations. As another example, the dock may obtain one or more of the interface requirements from one or more sources external to the dock (e.g., from the electronic device, one or more remote databases, etc.) when the interface requirements are needed by the dock to perform one or more of the foregoing operations (or other operations described herein). As yet another example, the dock may store a set of interface requirements (e.g., in its internal persistent storage) so that they may be quickly obtained by the dock when needed, but may also obtain other interface requirements from one or more sources external to the dock when the stored set of interface requirements are insufficient for performing one or more of the foregoing operations. As a further example, upon obtaining the interface requirements from an external source, the dock may store the obtained interface requirements (e.g., in its internal persistent storage) for later use and/or may remove other interface requirements (e.g., recently obtained sets of interface requirements may replace the least-recently used sets of interface requirements stored in the internal persistent storage of the dock).

In some embodiments, a dock may enable users with potentially unsecure or compromised electronic devices to nevertheless access content in a secure manner. In some embodiments, the dock may be implemented with various levels of security (e.g., restrictions on read, write, and execute access on the dock, authentication requirements, or other security measures). As an example, when an electronic device is connected with the dock, the dock may encrypt messages and transmit the encrypted messages on behalf of the electronic device to an intended recipient, and may decrypt encrypted messages directed to the electronic device and transmit the decrypted messages to the electronic device.

As another example, the dock may enable a user of an electronic device (connected to the dock) to view or access confidential or other content in a secure manner despite security flaws of the electronic device. In one use case, the dock may process a content request from the electronic device and obtain the requested content based on the request, but may cause the requested content to be presented via the dock's own output devices without ever providing the requested content to the electronic device. In this way, for example, the user may view or access the requested content without exposing the requested content to malware or other potential issues that may exist on the electronic device.

As yet another example, the dock may enable a user of an electronic device (connected to the dock) to securely provide inputs (e.g., authorization-related inputs or other inputs) to the dock despite security flaws of the electronic device. In one scenario, the dock may process a request from the electronic device to access content available at an external source, and transmit the request to the external source to initiate such access. Responsive to obtaining the request from the dock, the external source may solicit authentication information from the dock. The dock may then cause a prompt for the authentication information to be presented to the user (e.g., via the dock's output device, via the electronic device, etc.). If, for example, the user utilizes the dock's input device (as opposed to an input device of the electronic device) to provide the authentication information, the dock may process and transmit the necessary authentication process to enable access to content at the external source (e.g., for a single session, for multiple sessions, etc.). However, in one scenario, the authentication information provided by the user via the dock's input device may not be provided to the electronic device. In this way, the user is able to provide the authentication information without exposing such information to malware or other potential issues that may exist on the electronic device.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

DETAILED DESCRIPTION OF THE INVENTION

In the following description, for the purposes of explanation, numerous specific details are set forth in order to provide a thorough understanding of the embodiments of the invention. It will be appreciated, however, by one skilled in the art that the embodiments of the invention may be practiced without these specific details or with an equivalent arrangement. In other instances, well-known structures and devices are shown in block diagram form in order to avoid unnecessarily obscuring the embodiments of the invention.

Some embodiments may include a dock capable of connecting two electronic devices, like a cell phone and a user interface suitable for a desktop computer (e.g., a keyboard and computer monitor connected to a computing device on the same local area network as the dock). In some embodiments, the dock is a universal dock operative to interface with different cell phones from different vendors and running different operating systems. Some embodiments may exchange video data between the docked device (e.g., the cell phone) and a monitor via a peer-to-peer networking protocol like Miracast or Web RTC. In some cases, such protocols may mitigate bandwidth bottlenecks often observed with protocols relying on a centralized device to route video data, e.g., in a traditional client-server architecture. Further, some embodiments may wirelessly exchange data with the docked device in a manner that carefully allocates scarce bandwidth in potentially crowded wireless environments, like in an office with dozens of the presently described docks within wireless range of one another. To this end, some embodiments may dynamically lower broadcast strength based on sensed parameters of a wireless environment, like a signal-to-noise or signal-to-interference-and-noise ratio. And some embodiments may negotiate broadcast strength with other docks based on relative amounts of packet loss experienced by the different devices. Further, some embodiments may select wireless channels dynamically based on which channels are in use by other docks in range. To further facilitate enterprise usage, some embodiments may be configured to operate on secure local area networks and exchange 802.1x certificates with a certificate authority on the network.

It should be noted, however, that not all embodiments provide all of the above-described benefits. The various inventions described herein are independently useful. Thus, some embodiments are not universal, some embodiments do not use a peer-to-peer video networking protocol, some embodiments are not wireless, and some embodiments are not suitable for enterprise usage. Further, other problems addressed by other variations are described below.

System Description Related to One or More Embodiments

Figure 1:
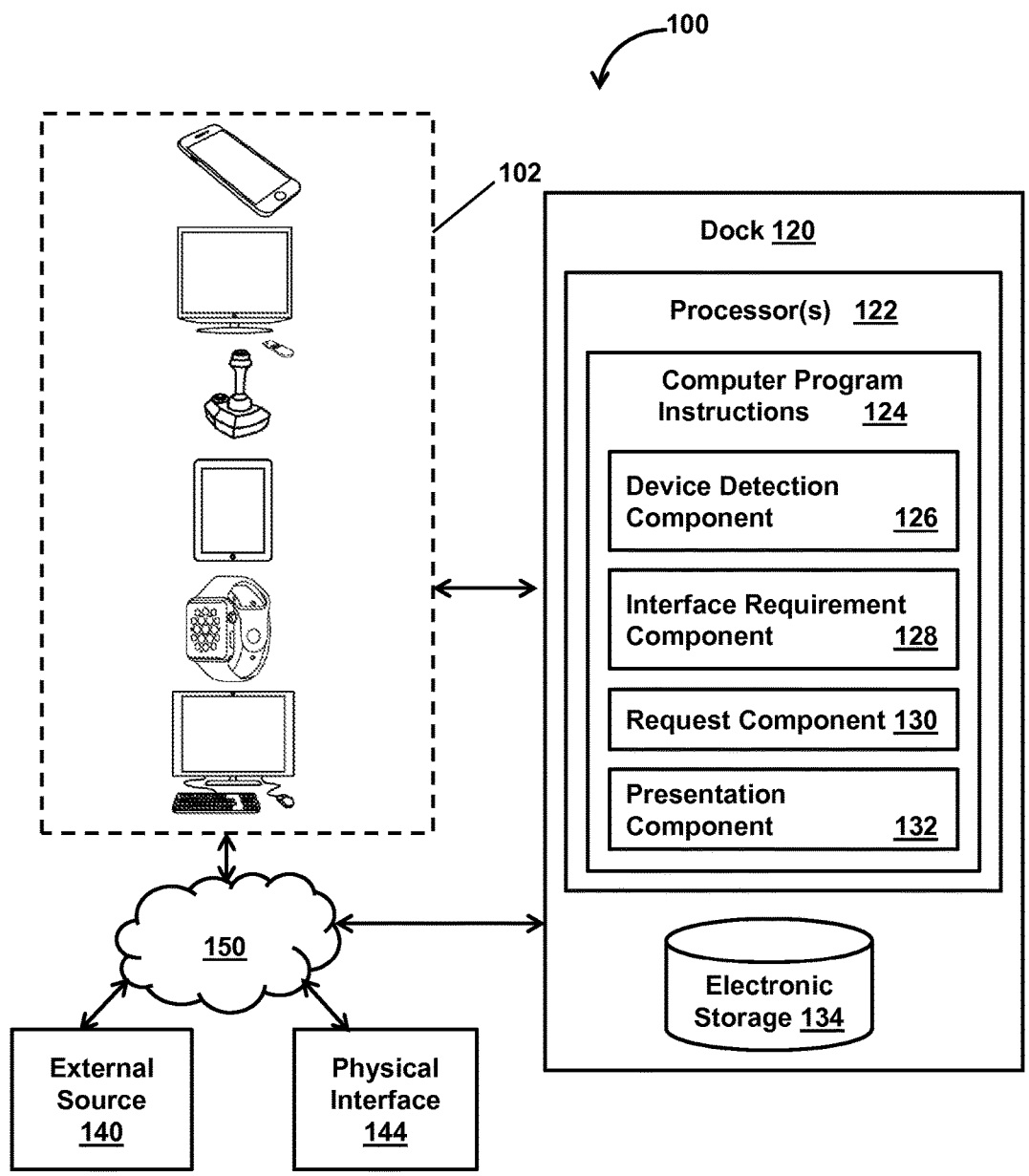
FIG. 1 shows a system comprising a dock for extending the utility of electronic devices, according to one or more embodiments.

FIG. 1 shows a system 100 comprising dock 120 for extending the utility of electronic devices. As an example, the dock 120 may be an "intelligent" dock that pairs with different electronic devices running different operating systems (e.g., iOS™ devices, Android™ devices, etc.). In some embodiments, for instance, the dock 120 may include an operating system to manage the interface requirements for different hardware/software vendors to increase compatibility of the dock 120 with various types of electronic devices.

As shown in FIG. 1, the dock 120 may comprise one or more physical processors 122, electronic storage 134, and/or other components. Processors 122 may be programmed with computer program instructions 124 to execute one or more computer program components. The computer program components may include one or more of a device detection component 126, an interface requirement component 128, a request component 130, a presentation component 132, and/or other components.

The electronic storage 134 may comprise non-transitory storage media that electronically stores information. The electronic storage media of the electronic storages may include one or both of system storage that is provided integrally (e.g., substantially non-removable) with the dock 120 or removable storage that is removably connectable to the dock 120 via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the dock 120, information received from client computing platforms, or other information that enables the dock 120 to function as described herein.

The processors 122 may be programmed to provide information processing capabilities in the dock 120. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions 124 to perform functions described herein of components 126, 128, 130, 132, or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different components 126, 128, 130, or 132 described herein is for illustrative purposes, and is not intended to be limiting, as any of components 126, 128, 130, or 132 may provide more or less functionality than is described, and which is not to imply that any other description herein is intended to be limiting. For example, one or more of components 126, 128, 130, or 132 may be eliminated, and some or all of its functionality may be provided by other ones of components 126, 128, 130, or 132. As another example, additional components may be programmed to perform some or all of the functionality attributed herein to one of components 126, 128, 130, or 132.

Dock 120 may further comprise one or more physical interfaces 144. In some embodiments, the physical interfaces 144 may include a dock accessory. In some embodiments, the physical interfaces 144 may provide an interface between the dock 120 and a user of system 100 through which the user may provide content to and/or receive content from dock 120, external sources 140, and/or other components of system 100. This enables data, results, reports, text, audio, video, and/or other communicable items, collectively referred to as "content", to be communicated between the user and dock 120 (and/or other components of system 100). The physical interfaces may include output devices, input devices, or other physical interfaces. In some cases, the dock lacks a physical video interface for a monitor and a physical keyboard interface, as access to these interfaces may be provided via a local area network on which corresponding signals are multiplexed, to reduce the cost and size of the dock. Or some embodiments may include these interfaces to expand the use cases for the dock. Examples of interface devices suitable for inclusion in a physical interface 144 of the dock 120 include one or more of a keypad, buttons, switches, a keyboard, knobs, levers, a display screen, a track pad, a touch screen, speakers, a microphone, an indicator light, an audible alarm, a printer, and/or other interfaces through which the user may provide and/or receive information. It is to be understood that other communication techniques, either hardwired or wireless, are also contemplated by the inventors as a physical interface of the dock. As such, any technique for communicating information between dock 120 and external sources 140 and/or other components of the system 100 is contemplated as a physical interface 144.

The external source(s) 140 may include sources of information, hosts and/or providers of information and/or services outside of the system 100, external entities participating with the system 100 (e.g., cloud storage), and/or other resources. In some embodiments, some or all of the functionality attributed herein to external sources 140 may be provided by resources included in the system 100.

Network 150 may include the Internet and/or other networks, Intranets, a PAN (Personal Area Network), a LAN (Local Area Network), a WAN (Wide Area Network), a SAN (Storage Area Network), a MAN (Metropolitan Area Network), near field communication, frequency (RF) link, Bluetooth, Wi-Fi, Li-FI, a cellular communications network, a Public Switched Telephone Network, and/or any type(s) of wired or wireless network(s). It will be appreciated that this is not intended to be limiting and that the scope of this disclosure includes embodiments in which the dock 120, external source 140, physical interface 144, and/or electronic devices 102 are operatively linked via some other communication media. In some cases, the network is a secure local area network, such as a wired Ethernet network behind a firewall. In some cases, a dock physically connected to such a network may provide relatively secure network access, though other embodiments may access the network through other techniques.

In some embodiments, device detection component 126 may cause an establishment of a connection between the dock 120 and an electronic device (e.g., an electronic device 102). The electronic device may comprise a mobile phone, a computing platform, a desktop computer, a notebook computer, a netbook computer, a tablet computer, a smartphone, a navigation device, an electronic book device, a gaming device, a smart watch, a television, a phone, a camera, a printer, a scanner, a telecommunication device, electronic music devices, and/or other electronic devices having electronic circuits.

Device detection component 126 may establish the connection responsive to detecting the electronic device. Device detection component 126 may detect the electronic device via one or more wired or wireless approaches. For example, device detection component 126 may detect the electronic device via a coaxial cable, optical fiber cable, twisted pair, a charging cable, a charging station, direct connection through one or more ports, and/or other types of wired connections. Additionally, or alternatively, device detection component 126 may wirelessly detect the electronic device via Wi-Fi, Bluetooth, near-field communication (NFC), Qi-based, or other discovery techniques.

In some embodiments, the dock 120 may detect an electronic device in response to receiving a request for connection from the electronic device. Device detection component 126 may detect the electronic device by sending an inquiry to discover other devices with which to connect. In some embodiments, device detection component 126 may require authentication before connecting with the electronic device. In some embodiments, device detection component 126 may allow connection with the electronic device without authentication but requires authentication before exchanging content with the electronic device. In some embodiments, the dock 120 may be connected to more than one electronic device at a time. The authentication may include exchanging identifying information. For example, the electronic device may send information that can be used to identify the electronic device, such as a PIN code, encrypted keys, device type, device model, operating system information indicating the operating system of the device, a user ID, a password, a passkey, a fingerprint, voice verification information, biometric information, and/or other information. In some embodiments, once a first connection is established between the electronic device and the dock 120, no authentication may be needed for subsequent connections between the two devices. In some embodiments, individual connection sessions require individual authentications. In some embodiments, a connection between the electronic device and the dock 120 may be a direct connection (e.g., a peer-to-peer connection). In some embodiments, a connection between the electronic device and the dock 120 may be established through network 150.

In some embodiments, one or more specific wireless communication ranges of the dock 120, a wireless access point (e.g., a WiFi or other access point) to which the dock 120 is connected, or other component of the system 100 may be set (e.g., by modifying the output voltage of the wireless signals emitted by the component or via other techniques). A particular wireless communication range of a component may, for example, be different from the wireless communication range at which the component is capable of sending or receiving information from other components. In an embodiment, the device detection component 126 may be utilized to set the output power of wireless signals for the dock 120 (or other components of the system 120) to a default value (e.g., based on technology) or to a customized value. As an example, the output voltage of wireless signals emitted by the dock 120 may be set to a low output voltage to limit the distance that the wireless signals can travel (e.g., to reduce wireless interference with other nearby wireless devices, for security reasons, etc.). For instance, the broadcast strength of the dock may be set corresponding to a broadcast range of less than 10 meters, e.g., less than 5 meters, or less than 1 meter, depending on tradeoffs between acceptable rates of packet loss and crowding of wireless spectrum, like in an office. As another example, the output voltage of the wireless signals of the dock 120 may be increased to increase the distance that the wireless signals can travel. In some cases, the dock may operate as a wireless access point consistent with a version of the IEEE 802.11 family of protocols. In some embodiments, the dock effectuates a WiFi Direct™ connection with a docked electronic device, and the dock is connected to a local area network via a wireless or wired connection (e.g., an IEEE 802.3 Ethernet connection).

Interface requirement component 128 may be programmed to obtain one or more interface requirements for an electronic device that enable the dock 120 to interact with the electronic device. Interface requirements for the electronic device may, for example, comprise requirements needed for the dock to (1) transmit information to the electronic device such that the transmitted information can be properly interpreted by the electronic device, (2) receive and properly interpret information from the electronic device, (3) select, modify, or transmit content in a way so that the content is suitable for the electronic devices, (4) receive, modify, and present content from the electronic device in a way so that the content is more suitable for the dock, (5) etc. For example, the interface requirements may include hardware configuration, software configuration, manual operations, operating systems, display specifications, or other systems components to achieve one or more interfaces between the dock 120 and the electronic device. In some embodiments, the dock 120 and the electronic device may negotiate parameters that facilitate communications between the dock 120 and the electronic device. Interface requirements for the electronic device may include rules of communications between the dock and the electronic device. The parameters may include one or more of alphabet code, information transfer rate, parity, hardware features, software features, and/or other parameters.

In some embodiments, interface requirements may include parameters for facilitating presentation of information exchanged between the dock 120 and the electronic device. For example, if the electronic device is a television, the interface requirements may include specifications about the television size, model, operating system, and hardware specification that will facilitate presentation of the requested information in a format that is compatible with the television specifications. The example of the television may apply to other electronic devices (e.g., smartwatch, smartphone, tablet, or other electronic devices). The interface requirements may refer to parameters facilitating presentations of information on the dock or a dock output device. For example, dock 120 may be programmed to modify information received from the electronic device and/or other output device such that the information is presented in a format compatible with the dock 120 and/or the dock output device.

Request component 130 may be programmed to obtain a request from an application of an electronic device for content stored at a source external to the dock 120 and the electronic device. In some embodiments, the request may be obtained via a connection established between the dock 120 and the electronic device. In some embodiments, the request may be obtained based on interface requirements for the electronic device. An application of the electronic device may include a mobile application, a web application, and/or other applications. In some embodiments, request component 130 may require the electronic device to provide authentication for access to content stored at the external source. The authentication may be provided by the electronic device in the form of a user ID and password of an account at the external source, a passkey, a PIN code, and/or other authentication. In response to receiving authentication information from the electronic device, request component 130 may compare the authentication information received from the electronic device with authentication information provided by the external source. In some embodiments, request component 130 may send the authentication information received from the electronic device to the external device for verification. Request component 130 may perform encryption of the authentication information before sending it to the external source.

Figure 2:
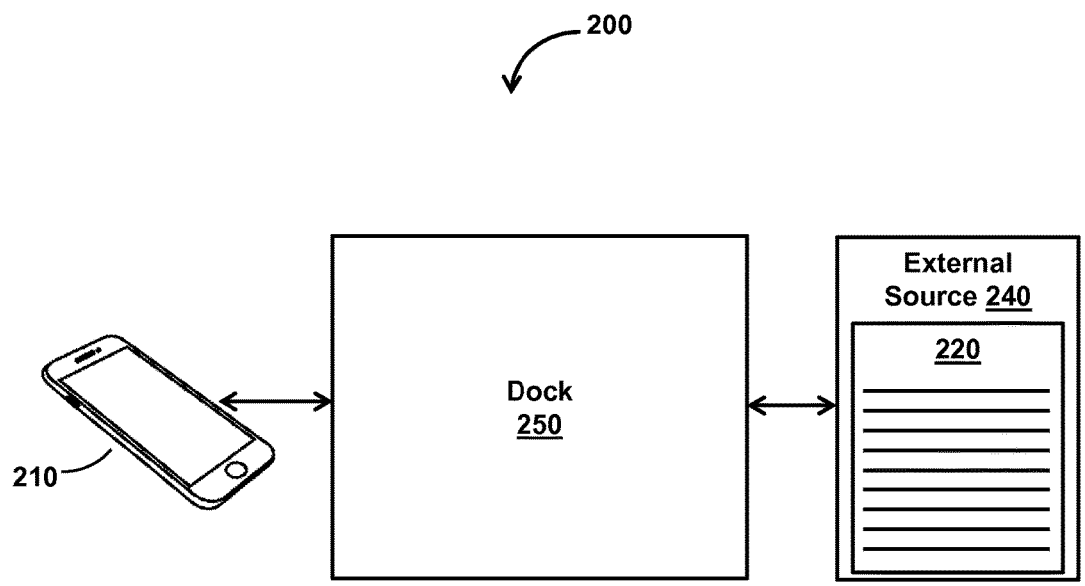
FIG. 2 shows an electronic device requesting content, located on an external source, via the dock, according to one or more embodiments.

As an example, with respect to FIG. 2, the dock 250 may wirelessly detect the smartphone 210 and, in response to the detection, establish a wireless connection with the smartphone 210. The wireless connection may comprise a Wi-Fi connection, a Bluetooth connection, an NFC connection, a Qi-based connection, and/or other wireless connections. In some cases, the wireless connection may include a connection suitable for conveying video, like a Wi-Fi connection offering over one megabit per second of bandwidth.

Once the connection is established between the smartphone 210 and the dock 250, the dock 250 may receive a request for content 220 located on the external source 240. In this example, content 220 may be a document. In some embodiments, the content 220 may comprise a webpage, video content, audio content, other content stored at or otherwise available via the external source, etc. Dock 250 may request authentication from the smartphone 210 to access the external source. For example, responsive to obtaining a request from the smartphone 210 to access a webmail application, the dock may process and send the request to the external source. In response, the external source may solicit a user ID and password from the dock for accessing the webmail application, and the dock may solicit the user ID and the password from the smartphone 210. In response to obtaining the authentication information from the smartphone 210, the dock 250 may send the authentication information to the external source for verification.

In some embodiments, the dock 120 may be configured to charge the electronic device and, thus, act as a wired or wireless charging station. As an example, the dock 120 may use resonant charging or inductive charging, like Qi-based charging, or other wireless charging techniques to wirelessly transfer energy to the electronic device. In some cases, the dock 120 may be configured to receive energy form the electronic device (e.g., where the electronic device may alternatively charge the dock 120 via the wireless charging techniques described herein).

In some embodiments, the dock 120 may be configured to provide updates to an operating system, an application, or other component of an electronic device (e.g., via a connection established between the electronic device and the dock 120). Referring to FIG. 1, for example, the dock 120 may provide an update to the operating system of an electronic device 102 in response to detecting an update related to the electronic device 102. In one scenario, dock 120 may provide the electronic device 102 with the choice of whether to update the operating system (e.g., by prompting a user of the electronic device 102). Responsive to the electronic device 102 accepting the update, dock 120 may update the operation system of the electronic device. In other scenarios, the dock 120 may facilitate updates of an application or other component of the electronic device 102 in a similar manner.

In some embodiments, the dock 120 may check for updates to an operating system, an application, or other component of an electronic device (e.g., a device that is connected or has previously connected with the dock 120, a device that has been detected by the dock 120, etc.). As an example, the dock 120 may query one or more sources (e.g., external to the dock 120) to determine whether one or more updates for a component of an electronic device 102 is available (1) based on a schedule, (2) on a periodic basis, (3) based on the electronic device 102 connecting with the dock 120, (4) based on the electronic device being detected, or (5) other criteria. If such an update is available, the dock 120 may download one or more files corresponding to the update and/or transmit a notification to the electronic device 102 regarding the update (e.g., prompting a user of the electronic device 102 to accept or decline the update, directing the electronic device to an external source from which the update may be downloaded, etc.).

In one use case, the dock 120 may download the update files regardless of whether the electronic device is currently connected to the dock 120, and store the update files on internal persistent storage of the dock 120. When the electronic device 102 connects with the dock 120, the dock 120 may provide the update files to the electronic device 102 to cause the electronic device 102 to be updated with the update files. The dock 120 may also provide a prompt to the electronic device 102 to accept or decline the update and, responsive to an acceptance from the electronic device, the dock 120 may provide the update files to the electronic device. In another use case, the dock 120 may download the update files based on (1) the electronic device 102 currently being connected to the dock 120, (2) a prediction that the electronic device 102 will soon be connected to the dock 120 (e.g., derived from the electronic device 102 being detected within a proximity of the dock 120), or (3) other criteria.

In some embodiments, presentation component 132 may be programmed to cause content or a graphical or audio user interface to be presented via one or more output devices of the dock 120 (e.g., physical interfaces 144 of the dock 120). In some cases, data encoding the content or graphical or audio user interface may be exchanged with a remote physical device (like a speaker or monitor) via a secure local area network, like via an Ethernet network subject to IEEE 802.1X port-based network access control. The output devices may comprise a display screen, a printer, a speaker, a scanner, and/or other output devices configured to output information. In some embodiments, the presentation component 132 may cause content requested by an electronic device (connected to the dock 120) to be presented via the output devices and/or the electronic device. In some embodiments, the presentation component 132 may be programmed to present content on the output device without providing the requested content to the electronic device. In some embodiments, the requested content may be presented only on the electronic device. In some cases, where for example the requested content is confidential, includes sensitive information, restricted, and/or for other reasons, the content may be presented only on an output device of the dock 120 (e.g., without providing the requested content to the electronic device 102). The restriction of the presentation to an output device of the dock 120 (as opposed to the electronic device 102) may be based on (1) a default measure for all content requested by the electronic device 102, (2) an indication from a source (of the requested content) that the requested content is to be restricted to the dock 120, (3) an indication from the electronic device 102 that the requested content is to be restricted to the dock 120, or (4) other criteria.

Figure 3:
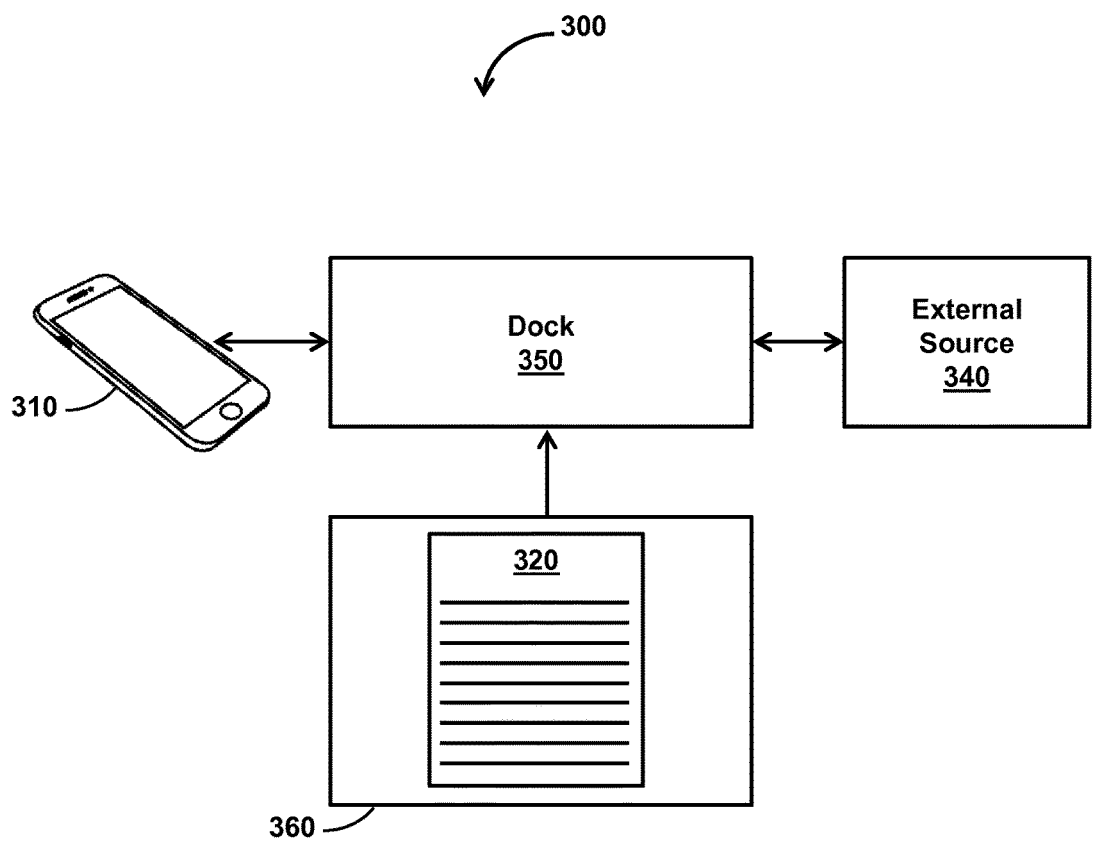
FIG. 3 shows a requested content presented on an output device, according to one or more embodiments.

As an example, with respect to FIG. 3, smartphone 310 may request content 320 from external source 340. Upon obtaining the requested content on behalf of the smartphone 310, the dock 350 may present the requested content on display 360 of the dock 350. As another example, the dock 350 may present content requested by the electronic device via an audio device of the dock 350.

In some embodiments, the dock 120 may present a verification code via an output device of the dock 120 (e.g., an audio device of the dock 120, a display screen of the dock 120, etc.) that would need to be provided by an electronic device in order for the electronic device to be successfully connected with the dock 120 (e.g., successfully paired with the dock 120). In an embodiment, a user may manually enter the verification code into the electronic device during the pairing process, and, upon entry by the user, the electronic device may transmit the entered verification code to the dock 120. If the entered verification code matches the presented verification code, the dock 120 may establish a connection with the electronic device and may "remember" the electronic device for subsequent connections. In some embodiments, the dock 120 may obtain content requested by an electronic device (connected to the dock 120) and cause the requested content to be presented on one or more output devices of the dock 120 and/or the electronic device for the duration of a connection established between the electronic device and the dock 120. For example, if the connection between the dock and the electronic device is dropped or otherwise ended, access to the requested content (and presentation thereof) may be revoked, thereby causing the requested content not to be presented on either the output devices of the dock or the electronic device. As a further example, if a subsequent connection is established between the dock 120 and the electronic device, a new request for the content may be received by the dock from the electronic device. After an authentication process, the dock may cause the requested content to be presented again (e.g., on the output devices of the dock, the electronic device, etc.).

In some embodiments, the dock 120 may not store content (requested by an electronic device) on its internal persistent storage. In an embodiment, for example, once a connection between the dock 120 and the electronic device is terminated, neither one of them may store the requested content. In some embodiments, dock 120 may store the requested content (e.g., on its internal persistent storage) after presenting the requested content such that, if the connection is terminated, the electronic device may access the requested content by establishing a subsequent connection with the dock 120. In some embodiments, the electronic device may store the requested content after receiving the requested content from the dock 120 (e.g., if the dock 120 provides the requested content to the electronic device).

In some embodiments, the dock 120 may obtain, via an established connection with electronic device 102, a request from the application of the electronic device for content based on the interface requirements. The dock 120 may provide, via the established connection, the requested content to the electronic device 102 based on the interface requirements for presentation via the application of the electronic device 102. In some embodiments, the dock 120 may be caused to modify the requested content based on the interface requirements. The dock 120 may provide the requested content to the electronic device by providing the modified requested content to the electronic device 102 via the established connection. In some embodiments, the dock 120 may modify the content so that the content is more suitable for presentation via the electronic device and/or more suitable for presentation via one or more output devices of the dock 120. As an example, the dock 120 may rearrange elements of the requested content, resize the requested content (or elements thereof), remove one or more elements from the requested content, cause one or more elements of the requested content to be hidden, or perform other modifications to the requested content prior to sending the modified requested content to the electronic device.

In some embodiments, the dock 120 may modify received information from an electronic device (connected to the dock 120) before sending the information to an external source (e.g., the external source 140). Modification may be based on one or more interface requirements of the electronic device and/or one or more interface requirements of the external source. The interface requirements may include operating system requirement, user interface requirement, display requirement, language requirement, size requirement, hardware requirement, software requirement, network requirement, and/or other requirement (e.g., that may facilitate interface, communication, and/or exchange of information between the electronic device and the dock 120).

In some embodiments, the dock 120 may comprise one or more input devices. In one use case, an input device of the dock 120 may be utilized by a user to generate a request at an electronic device (connected to the dock 120), which may result in the electronic device transmitting the generated request to the dock 120. The input device may comprise one or more of a keypad, buttons, switches, a keyboard, knobs, levers, a display screen, a track pad, a touch screen, speakers, a microphone, and/or other interfaces through which the user may provide information.

Figure 4:
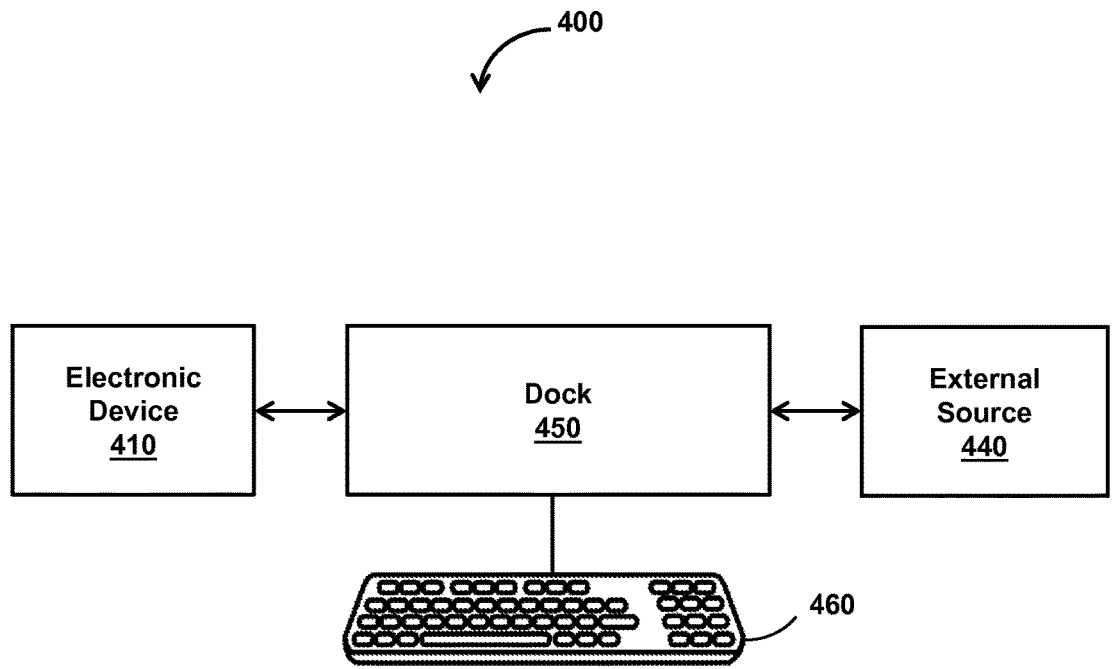
FIG. 4 shows a dock including an input device, according to one or more embodiments.

In another use case, the use of an input device of the dock 120 may help keep information from reaching an electronic device and, thus, from being stored, accessed, and/or manipulated at the electronic device. For example, authentication information needed to establish a connection with the dock, or with the external source, may be directly provided to the dock through the input device without being provided to the electronic device to prevent the authentication information from being stored or access at the electronic device. In one use case, with respect to FIG. 4, dock 450 may detect an electronic device 410. The dock 450 may request authentication information from the electronic device 410 before establishing a connection with the electronic device 410. The user of the electronic device 410 may provide the authentication information to the dock 450 using keyboard 460. Once the connection is established between the electronic device 410 and the dock 450, the dock 450 may receive a request from the electronic device 410 for content located on external source 440. The dock 450 may solicit the electronic device 410 for authentication information to access the external source. For example, the dock 450 may solicit the electronic device for a user ID and password, a passkey, a PIN, a code, a fingerprint, a voice verification, a biometric information, and/or other authentication information. The user of the electronic device 410 may provide the authorization information for obtaining the requested content using the keyboard 460. In response to receiving the authorization information for obtaining the requested content, the dock 450 may send the authentication information to the external source 440 for verification. In some cases, dock 450 may compare the authentication information received from electronic device 410 with authentication information related to electronic device 410 received from the external source 440 to authenticate the electronic device 410. In some embodiment, the dock 450 may encrypt the authentication information before sending it to the external source 440. The dock may modify the format of the authentication information before sending to the external source 440. Once the electronic device is authenticated, the dock 450 may present the requested information to the electronic device and/or on an output device of the dock 450.

In some embodiments, the dock 120 may establish one or more connections with one or more dock accessories. The dock accessories may comprise input devices, output devices, or other accessories for the dock. Once connected, the dock accessories may act as input or output devices of the dock 120. In an embodiment, the dock 120 may establish a first wireless connection with an electronic device responsive to detecting the electronic device. The dock 120 may establish a second wireless connection between the dock and a dock accessory responsive to detecting the dock accessory. The dock may obtain, via the first wireless connection, a content request from the electronic device (e.g., a request for content stored at the dock, a request for content stored at an external source, or other request). The dock 120 may obtain, via the second wireless connection, an input related to the content request from the dock accessory. The dock 120 may obtain the requested content based on the content request and the related input (e.g., from its internal persistent storage, from the external source, etc.). In an embodiment, the related input (obtained from the dock accessory) is not provided to the electronic device. As an example, if authentication information is needed to further process the content request (e.g., to obtain the requested content from the external source), the dock 120 may facilitate retrieval of the authentication information from a user via the dock accessory (e.g., as opposed to via the electronic device) to prevent the user from revealing the authentication information to malware or other issues that may exist on the electronic device.

In an embodiment, the dock 120 may provide content requested by an electronic device (connected to the dock 120) to a dock accessory (connected to the dock 120) to cause the requested content to be presented via the dock accessory. As an example, the dock 120 may provide the requested content to the dock accessory via a wireless connection (established between the dock 120 and the dock accessory) to cause the requested content to be presented via the dock accessory rather than the electronic device. As another example, the dock 120 may cause the requested content to be presented via both the dock accessory and the electronic device.

Figure 5:
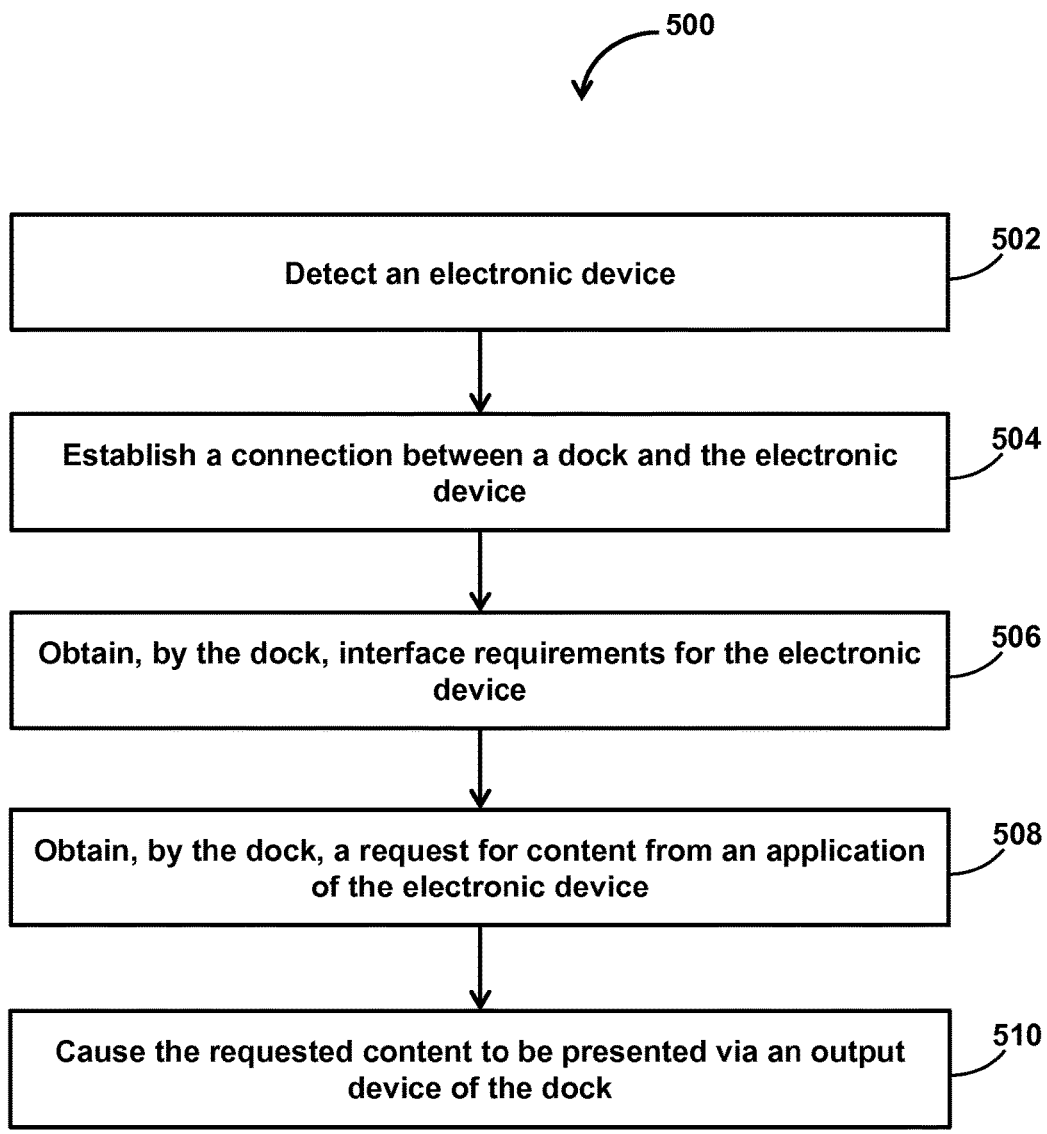
FIG. 5 is a flowchart of a method for extending the utility of electronic devices via a dock, according to one or more embodiments.

FIG. 5 is a flowchart of a method for extending the utility of electronic devices via a dock, according to an aspect of the invention. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 502, an electronic device may be detected (e.g., by a dock via one or more wired or wireless approaches). As an example, when the electronic device is within proximity of the dock, the dock may wirelessly detect the electronic device via Wi-Fi, Bluetooth, NFC, Qi-based, or other discovery techniques. Operation 502 may be performed by a component the same as or similar to the device detection component 126 described in FIG. 1, in accordance with one or more embodiments.

At operation 504, a connection between the dock and the electronic device may be established (e.g., responsive to the dock detecting the electronic device). Operation 504 may be performed by a component the same as or similar to the device detection component 126 described in FIG. 1, in accordance with one or more embodiments.

At operation 506, one or more interface requirements for the electronic device may be obtained by the dock. As an example, the interface requirement may enable the dock to interact with the electronic device. Operation 506 may be performed by a component the same as or similar to the interface requirement component 128 described in FIG. 1, in accordance with one or more embodiments.

At operation 508, a request (for content stored at a source external to the dock and the electronic device) may be obtained by the dock from an application of the electronic device. As an example, the dock may obtain the request based on the interface requirements via the established connection between the dock and the electronic device. Operation 508 may be performed by a component the same as or similar to the request component 130 described in FIG. 1, in accordance with one or more embodiments.

At operation 510, the requested content may be caused to be presented via one or more output devices of the dock. In some embodiments, the output devices may include a display screen of the dock, an audio device of the dock, or other output device of the dock. As an example, responsive to obtaining the requested content from the external source, the dock may cause the requested content to be presented via an output device of the dock without providing the requested content to the electronic device. Operation 510 may be performed by a component the same as or similar to the presentation component 132 described in FIG. 1, in accordance with one or more embodiments.

Figure 6:
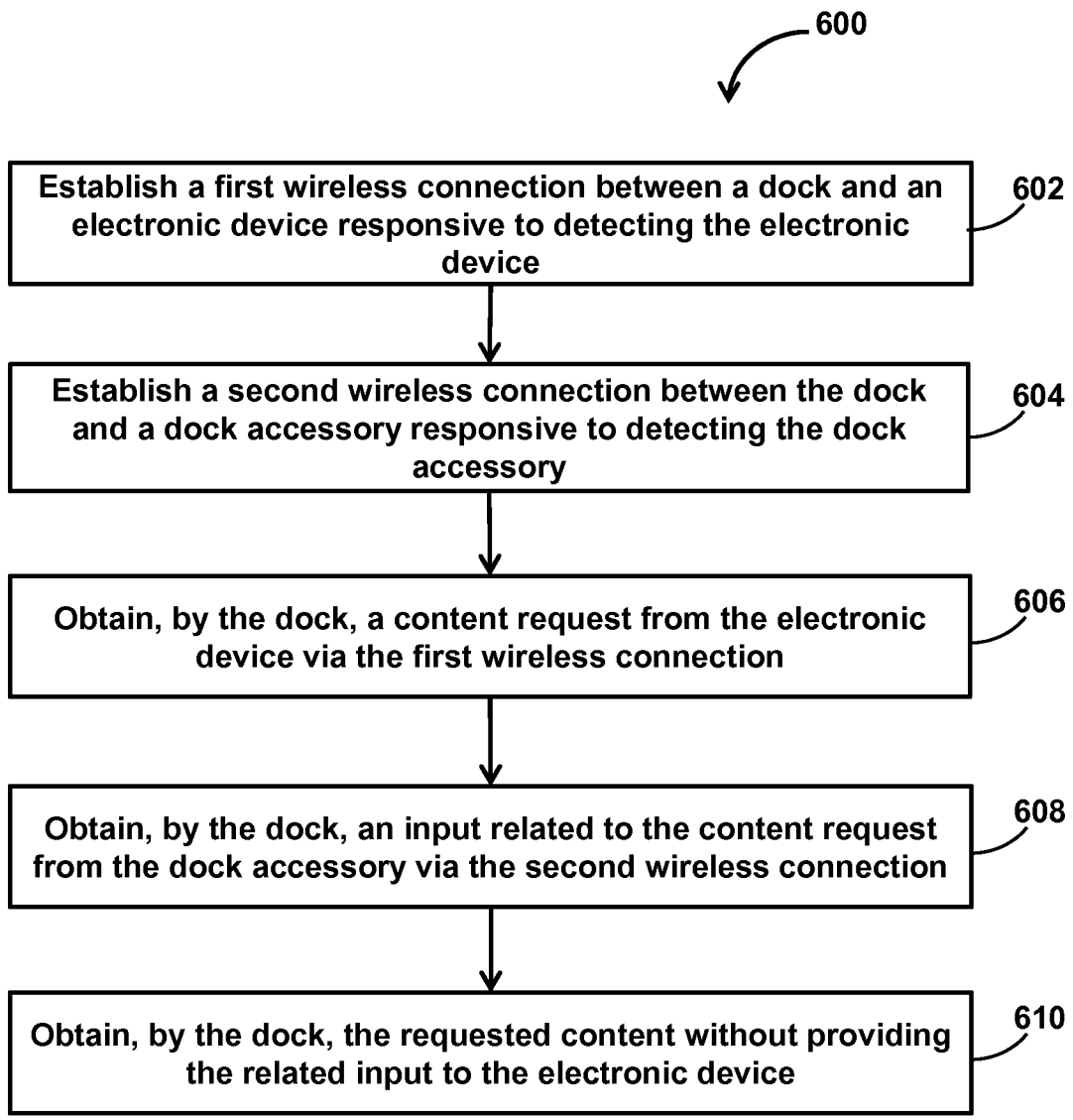
FIG. 6 is a flowchart of a method for extending the utility of electronic devices via a dock and a dock accessory, according to one or more embodiments.

FIG. 6 is a flowchart of a method for extending the utility of electronic devices via a dock and a dock accessory, according to an aspect of the invention. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At operation 602, a first wireless connection may be established between a dock and an electronic device responsive to the dock detecting the electronic device. Operation 602 may be performed by a component the same as or similar to the device detection component 126 described in FIG. 1, in accordance with one or more embodiments.

At operation 604, a second wireless connection may be established between the dock and a dock accessory responsive to the dock detecting the dock accessory. Operation 604 may be performed by a component the same as or similar to the device detection component 126 described in FIG. 1, in accordance with one or more embodiments.

At operation 606, a content request may be obtained by the dock from the electronic device via the first wireless connection. Operation 606 may be performed by a component that is the same as or similar to the request component 130 described in FIG. 1, in accordance with one or more embodiments.

At operation 608, an input related to the content request (obtained from the electronic device) may be obtained from the dock accessory via the second wireless connection. Operation 608 may be performed by a component the same as or similar to the request component 130 described in FIG. 1, in accordance with one or more embodiments.

At operation 610, the requested content may be obtained based on the content request and the related input. As an example, the requested content may be obtained from the external source based on the content request and the related input without providing the related input to the electronic device. Operation 610 may be performed by a component the same as or similar to the presentation component 132 described in FIG. 1, in accordance with one or more embodiments.

Figure 7:
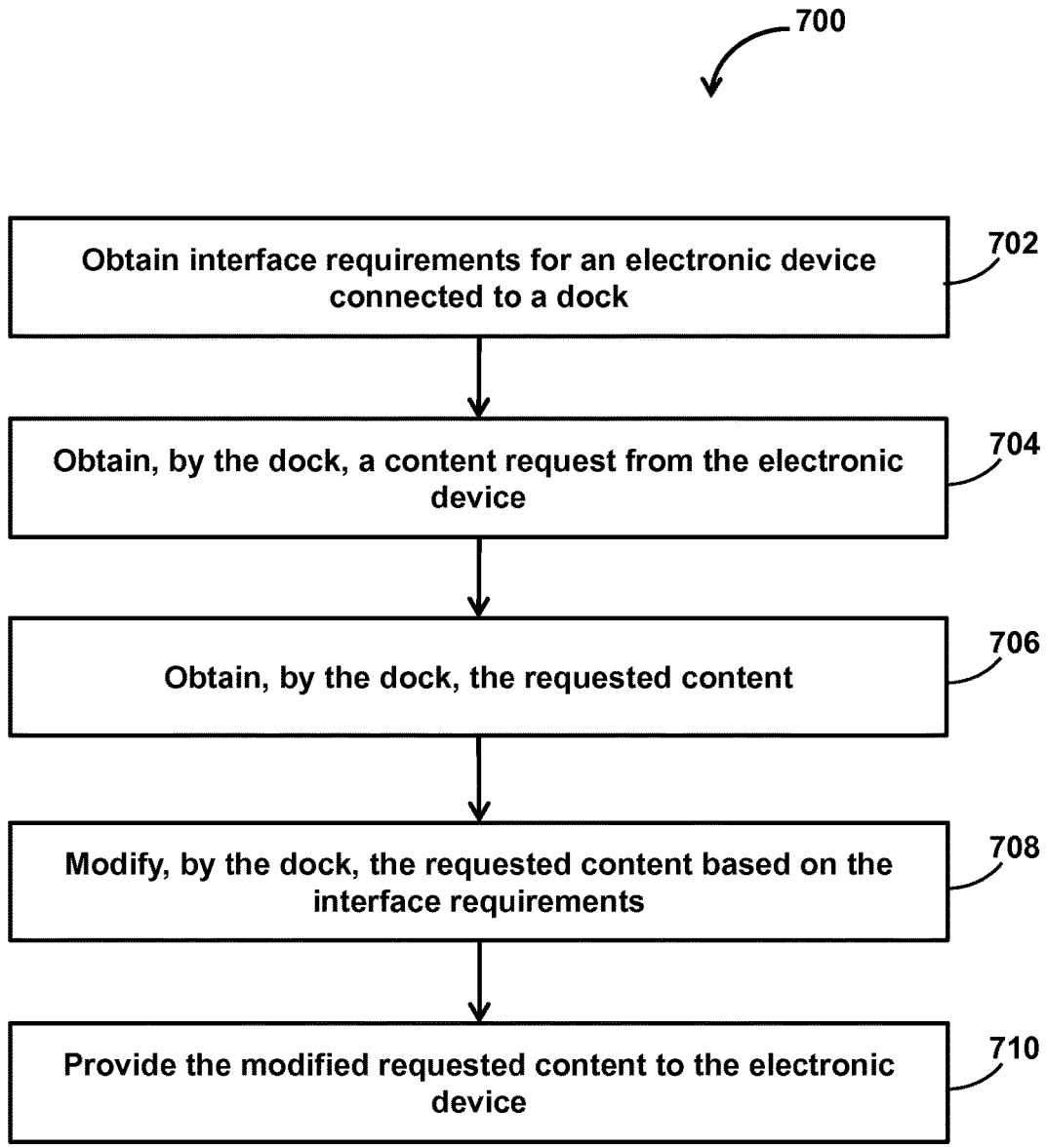
FIG. 7 is a flowchart of a method for extending the utility of electronic devices via content modification by a dock, according to one or more embodiments.

FIG. 7 is a flowchart of a method for extending the utility of electronic devices via content modification by a dock, according to an aspect of the invention. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

At operation 702, one or more interface requirements for an electronic device connected to a dock may be obtained. The interface requirements may enable the dock to interact with the electronic device. Operation 702 may be performed by a component the same as or similar to the interface requirement component 128 described in FIG. 1, in accordance with one or more embodiments.

At operation 704, a content request may be obtained by the dock from the electronic device. As an example, a request for content stored at a source (external to the dock and the electronic device) may be obtained by the dock from an application of the electronic device based on the interface requirements via a connection established between the dock and the electronic device. Operation 704 may be performed by a component the same as or similar to the request component 130 described in FIG. 1, in accordance with one or more embodiments.

At operation 706, the requested content may be obtained by the dock based on the content request. As an example, the requested content may be obtained from the external source based on the content request. Operation 706 may be performed by a component the same as or similar to the request component 130 described in FIG. 1, in accordance with one or more embodiments.

At operation 708, the requested content may be modified by the dock based on the interface requirement. Operation 708 may be performed by a component the same as or similar to the presentation component 132 described in FIG. 1, in accordance with one or more embodiments.

At operation 710, the modified requested content may be provided to the electronic device. Operation 710 may be performed by a component the same as or similar to the presentation component 132 described in FIG. 1, in accordance with one or more embodiments.

In some embodiments, the electronic device coupled to the dock may be a smart phone executing a docking native application. The application may be configured to present the device as a computing resource on a local area network via the dock. In some embodiments, a user may execute a productivity application on the mobile device (like a spreadsheet, email client, or word processor), and manipulate a document stored on the network, or vice versa. In some cases, such interactions may be effected via a physical user interface, like a keyboard and monitor, connected to the smart phone via the dock and a local area network. Such user interfaces are expected to be relatively ergonomic compared to interactions directly with a mobile device. And in use cases in which the dock is connected to a secured local area network, security is expected to be relatively simple to implement, e.g., by granting the dock (in the role of supplicant) an IEEE 802.1x digital certificate to access the network automatically from a remote authentication server, rather than individually re-configuring each docked device to have access on the secure network.

In some embodiments, the docking native application may be operative to transmit video of the screen of the mobile device, via a local area network, to a remote monitor. In some cases, the remote monitor may be coupled to a computing device operate to receive the video, decode the video, and cause the video to be displayed. For instance, the remote monitor may include an HDMI dongle, connected to the network, executing an application that displays video addressed to the dongle on the network. In other cases, another computing device, like a laptop computer or a desktop computer, coupled to the monitor may execute an application that receives video from the mobile device. In some cases, the application is a web browser that has established a WebRTC connection with the dock.

Various protocols may be used to transmit the video. In some enterprise environments, a relatively large number of the docks may be in operation. As a result, video feeds may tend to overwhelm centralized choke points through the network. To mitigate this issue, some embodiments may transmit video directly between the dock and the computing device coupled to the monitor (e.g., by a wired connection, like via an HDMI cable or display port cable) a by peer-to-peer video protocol, like WebRTC or Miracast. To this end, some embodiments on the mobile device may engage the mDisplayManager object in the Android™ operating system and engage the presentation application program interface to effectuate a remote display. Similar techniques may be used in other operating systems. A video protocol handler on the mobile device may encode the content of the mobile device display screen and cause that encoded content to be transmitted to the remote monitor via the local area network. The remote monitor may decode the encoded content and display the content on the monitor. As a result, a user may view the display of their mobile device on a larger screen display.

The native application may further include a USB-to-Ethernet translator, operative to convert remote commands from a USB keyboard, sent via the local area network, to commands recognized by the productivity application executing on the mobile device. For instance, the Synergy library or other application may be executed to share a keyboard or mouse on a desktop computer with the mobile device connected to the dock.

Thus, in some embodiments, a user may dock their phone, and then access files on their phone or use applications executing on their phone, via their desktop computer's keyboard, mouse, and monitor, which are often more ergonomic than the interfaces on a mobile device. As a result, users may have a relatively uniform computing experience in different locations by carrying their applications and associated configurations and files with them, in some cases, even without Internet access.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Embodiments will be better understood with reference to the following enumerated embodiments:

1. A dock for extending the utility of electronic devices, the dock comprising: one or more output devices; one or more physical processors programmed with computer program instructions which, when executed, cause the dock to effectuate operations comprising: responsive to detecting an electronic device, cause an establishment of a connection between the dock and the electronic device; obtain one or more interface requirements for the electronic device that enable the dock to interact with the electronic device; obtain, via the established connection, based on the one or more interface requirements, a request from an application of the electronic device for content stored at a source external to the dock and the electronic device; and responsive to obtaining the requested content from the external source, cause the requested content to be presented via at least one of the one or more output devices.

2. The dock of embodiment 1, wherein the dock causes the requested content to be presented via at least one of the one or more output devices without providing the requested content to the electronic device.

3. The dock of any of embodiments 1-2, wherein the one or more output devices comprise a display screen of the dock, and wherein the dock causes the requested content to be presented via at least one of the one or more output devices by causing the requested content to be presented via the display screen.

4. The dock of any of embodiments 1-3, wherein the one or more output devices comprise an audio device of the dock, and wherein the dock causes the requested content to be presented via at least one of the one or more output devices by causing the requested content to be presented via the audio device.

5. The dock of any of embodiments 1-4, wherein the dock is further caused to: obtain, via the established connection, a request from the application of the electronic device for second content based on the one or more interface requirements; and provide, via the established connection, the requested second content to the electronic device based on the one or more interface requirements for presentation via the application of the electronic device.

6. The dock of embodiment 5, wherein the dock is further caused to: modify the requested second content based on the one or more interface requirements, wherein the dock provides the requested second content to the electronic device by providing the modified requested second content to the electronic device via the established connection.

7. The dock of any of embodiments 1-6, wherein the established connection comprises a wireless connection between the dock and the electronic device.

8. The dock of embodiment 7, wherein the wireless connection comprises a Wi-Fi connection, a Bluetooth connection, or a near-field communication (NFC) connection.

9. The dock of embodiment 7, wherein the wireless connection is a first wireless connection, and wherein the dock is further caused to: responsive to detecting a dock accessory, cause an establishment of a second wireless connection between the dock and the dock accessory; obtain, via the second wireless connection, an input related to the content request from the dock accessory; and obtain, based on the content request and the related input, the requested content from the external source.

10. The dock of embodiment 9, wherein the related input is not provided to the electronic device.

11. The dock of embodiment 9, wherein the related input from the dock accessory comprises an input related to authorization for obtaining the requested content.

12. The dock of embodiment 7, wherein the wireless connection is a first wireless connection, and wherein the dock is further caused to: responsive to detecting a dock accessory, cause an establishment of a second wireless connection between the dock and the dock accessory; responsive to obtaining the requested content from the external source, provide the requested content to the dock accessory via the second wireless connection.

13. The dock of any of embodiments 1-12, wherein the dock comprises an input device, and wherein the content request is initiated via the input device.

14. A method of extending the utility of electronic devices via a dock, the method being implemented on the dock that comprises one or more one or more physical processors programmed with computer program instructions which, when executed, perform the method, the method comprising: causing, by the dock, an establishment of a connection between the dock and an electronic device responsive to detecting the electronic device; obtaining, by the dock, one or more interface requirements for the electronic device that enable the dock to interact with the electronic device; obtaining, by the dock, via the established connection, based on the one or more interface requirements, a request from an application of the electronic device for content stored at a source external to the dock and the electronic device; and causing, by the dock, the requested content to be presented via one or more output devices of the dock responsive to obtaining the requested content from the external source.

15. The method of embodiment 14, further comprising: causing, by the dock, the requested content to be presented via the one or more output devices without providing the requested content to the electronic device.

16. The method of any of embodiments 14-15, wherein the one or more output devices comprise a display screen of the dock, and wherein the method further comprises: causing, by the dock, the requested content to be presented via the one or more output devices by causing the requested content to be presented via the display screen.

17. The method of any of embodiments 14-16, wherein the one or more output devices comprise an audio device of the dock, and wherein the method further comprises: causing, by the dock, the requested content to be presented via the one or more output devices by causing the requested content to be presented via the audio device.

18. The method of any of embodiments 14-17, further comprising: obtaining, by the dock, via the established connection, a request from the application of the electronic device for second content based on the one or more interface requirements; and providing, by the dock, via the established connection, the requested second content to the electronic device based on the one or more interface requirements for presentation via the application of the electronic device.

19. The method of embodiment 18, further comprising: modifying, by the dock, the requested second content based on the one or more interface requirements; and providing, by the dock, the requested second content to the electronic device by providing the modified requested second content to the electronic device via the established connection.

20. The method of embodiment 14, wherein the established connection comprises a wireless connection between the dock and the electronic device.

21. The method of embodiment 20, wherein the wireless connection comprises a Wi-Fi connection, a Bluetooth connection, or a near-field communication (NFC) connection.

22. The method of embodiment 20, wherein the wireless connection is a first wireless connection, the method further comprising: responsive to detecting a dock accessory, causing, by the dock, an establishment of a second wireless connection between the dock and the dock accessory; obtaining, by the dock, via the second wireless connection, an input related to the content request from the dock accessory; and obtaining, by the dock, based on the content request and the related input, the requested content from the external source.

23. The method of embodiment 22, wherein the related input is not provided to the electronic device.

24. The method of embodiment 22, wherein the related input from the dock accessory comprises an input related to authorization for obtaining the requested content.

25. The dock of embodiment 20, wherein the wireless connection is a first wireless connection, and wherein the dock is further caused to: responsive to detecting a dock accessory, cause an establishment of a second wireless connection between the dock and the dock accessory; responsive to obtaining the requested content from the external source, provide the requested content to the dock accessory via the second wireless connection.

26. The dock of any of embodiments 14-25, wherein the dock comprises an input device, and wherein the content request is initiated via the input device.

27. A tangible, machine-readable, non-transitory media storing instructions that when executed cause a data processing apparatus to effectuate the operations of any of embodiments 1-13.

The invention claimed is:

1. A dock for extending the utility of electronic devices, the dock comprising:
   one or more output devices;
   one or more physical processors programmed with computer program instructions that, when executed, cause the dock to effectuate operations comprising:
     responsive to detecting an electronic device, causing an establishment of a connection between the dock and the electronic device;
     obtaining one or more interface requirements for the electronic device that enable the dock to interact with the electronic device;
     obtaining, via the established connection, based on the one or more interface requirements, a request from an application of the electronic device for content stored at a source external to the dock and the electronic device; and
     responsive to obtaining the requested content from the external source, causing the requested content to be presented via at least one of the one or more output devices without the requested content being provided to the electronic device such that access to the requested content by any application existing on the electronic device is prevented.

2. The dock of claim 1, wherein the dock is caused to effectuate operations comprising:
obtaining authentication information related to the content request from an input device of the dock without the authentication information going to or through the electronic device; and
using the authentication information to obtain the requested content from the external source without the authentication information going to or through the electronic device.

3. The dock of claim 1, wherein the one or more output devices comprise a display screen of the dock or an audio device of the dock, and wherein the dock causes the requested content to be presented via at least one of the one or more output devices by causing the requested content to be presented via the display screen or the audio device.

4. The dock of claim 1, wherein the dock is further caused to effectuate operations comprising:
obtaining, via the established connection, a request from the application of the electronic device for second content based on the one or more interface requirements;
responsive to obtaining the requested second content, modifying the requested second content based on the one or more interface requirements, the modification comprising rearranging elements of the requested second content; and
providing, via the established connection, the modified requested second content to the electronic device based on the one or more interface requirements for presentation via the application of the electronic device such that the requested second content is modified before being provided to the electronic device.

5. The dock of claim 1, wherein the dock is further caused to effectuate operations comprising:
obtaining, via the established connection, a request from the application of the electronic device for second content based on the one or more interface requirements;
responsive to obtaining the requested second content, modifying the requested second content based on the one or more interface requirements, the modification comprising resizing the requested second content or resizing one or more elements of the requested second content; and
providing, via the established connection, the modified requested second content to the electronic device based on the one or more interface requirements for presentation via the application of the electronic device such that the requested second content is modified before being provided to the electronic device.

6. The dock of claim 1, wherein the dock is further caused to effectuate operations comprising:
obtaining, via the established connection, a request from the application of the electronic device for second content based on the one or more interface requirements;
responsive to obtaining the requested second content, modifying the requested second content based on the one or more interface requirements, the modification comprising causing one or more elements of the requested second content to be hidden during a presentation of the modified requested second content; and
providing, via the established connection, the modified requested second content to the electronic device based on the one or more interface requirements for presentation via the application of the electronic device such that the requested second content is modified before being provided to the electronic device.

7. The dock of claim 1, wherein the dock is further caused to effectuate operations comprising:
obtaining information from the electronic device that is to be provided to a destination external to the dock and the electronic device; and
modifying a resource size of the obtained information and providing the modified obtained information to the external destination such that the obtained information is modified before being provided to the external destination.

8. The dock of claim 1, wherein the established connection comprises a wireless connection between the dock and the electronic device, and wherein the wireless connection comprises a Wi-Fi connection, a Bluetooth connection, or a near-field communication (NFC) connection.

9. The dock of claim 1, wherein the established connection is a first wireless connection, and wherein the dock is further caused to effectuate operations comprising:
responsive to detecting a dock accessory, causing an establishment of a second wireless connection between the dock and the dock accessory;
obtaining, via the second wireless connection, an input related to the content request from the dock accessory without the related input going to or through the electronic device; and
obtaining, based on the content request and the related input, the requested content from the external source without the related input going to or through the electronic device.

10. The dock of claim 1, wherein the established connection is a first wireless connection, and wherein the dock is further caused to effectuate operations comprising:
responsive to detecting a dock accessory, causing an establishment of a second wireless connection between the dock and the dock accessory;
responsive to obtaining the requested content from the external source, providing the requested content to the dock accessory via the second wireless connection.

11. The dock of claim 1, wherein the dock is configured to prevent the electronic device's access to requested content or other information that the dock obtains from the external source such that the obtained requested or other information cannot be accessed by the electronic device.

12. The dock of claim 9, wherein the related input is obtained from the dock accessory without the related input being stored on the electronic device, without the related input being accessed by the electronic device, and without the related input being manipulated by the electronic device, and wherein the requested content is obtained from the external source based on the related input without the related input being stored on the electronic device, without the related input being accessed by the electronic device, and without the related input being manipulated by the electronic device.

13. The dock of claim 9, wherein the related input from the dock accessory comprises an input related to authorization for obtaining the requested content.

14. A method of extending the utility of electronic devices via a dock, the method being implemented on the dock that comprises one or more one or more physical processors programmed with computer program instructions that, when executed, perform the method, the method comprising:
causing, by the dock, an establishment of a connection between the dock and an electronic device responsive to detecting the electronic device;

obtaining, by the dock, one or more interface requirements for the electronic device that enable the dock to interact with the electronic device;

obtaining, by the dock, via the established connection, based on the one or more interface requirements, a request from an application of the electronic device for content stored at a source external to the dock and the electronic device; and causing, by the dock, the requested content to be presented via one or more output devices of the dock responsive to obtaining the requested content from the external source, wherein the requested content is obtained and presented without the requested content being provided to the electronic device such that access to the requested content by any application existing on the electronic device is prevented.

15. The method of claim 14, further comprising:

obtaining, by the dock, authentication information related to the content request from an input device of the dock without the authentication information going to or through the electronic device; and using, by the dock, the authentication information to obtain the requested content from the external source without the authentication information going to or through the electronic device.

16. The method of claim 14, wherein the one or more output devices comprise a display screen of the dock or an audio device of the dock, and wherein the method further comprises:

causing, by the dock, the requested content to be presented via the one or more output devices by causing the requested content to be presented via the display screen or the audio device.

17. The method of claim 14, further comprising:

obtaining, by the dock, via the established connection, a request from the application of the electronic device for second content based on the one or more interface requirements;

responsive to obtaining the requested second content, modifying, by the dock, the requested second content based on the one or more interface requirements, the modification comprising rearranging elements of the requested second content; and providing, by the dock, via the established connection, the modified requested second content to the electronic device based on the one or more interface requirements for presentation via the application of the electronic device such that the requested second content is modified before being provided to the electronic device.

18. The method of claim 14, further comprising:

obtaining, by the dock, via the established connection, a request from the application of the electronic device for second content based on the one or more interface requirements;

responsive to obtaining the requested second content, modifying, by the dock, the requested second content based on the one or more interface requirements, the modification comprising resizing the requested second content or resizing one or more elements of the requested second content; and providing, by the dock, via the established connection, the modified requested second content to the electronic device based on the one or more interface requirements for presentation via the application of the electronic device such that the requested second content is modified before being provided to the electronic device.

19. The method of claim 14, further comprising:

obtaining, by the dock, via the established connection, a request from the application of the electronic device for second content based on the one or more interface requirements;

responsive to obtaining the requested second content, modifying, by the dock, the requested second content based on the one or more interface requirements, the modification comprising causing one or more elements of the requested second content to be hidden during a presentation of the modified requested second content; and providing, by the dock, via the established connection, the modified requested second content to the electronic device based on the one or more interface requirements for presentation via the application of the electronic device such that the requested second content is modified before being provided to the electronic device.

* * * * *